(12) United States Patent
Calabro et al.

(10) Patent No.: US 9,048,971 B1
(45) Date of Patent: Jun. 2, 2015

(54) OPTICAL COMMUNICATION METHOD AND SYSTEM

(75) Inventors: Stefano Calabro, Munich (DE); Thomas Michaelis, Puchheim (DE)

(73) Assignee: Xieon Networks S.a.r.l., Luxembourg (LU)

( * ) Notice: Subject to any disclaimer, the term of this patent is extended or adjusted under 35 U.S.C. 154(b) by 94 days.

(21) Appl. No.: 13/990,855

(22) PCT Filed: Dec. 2, 2011

(86) PCT No.: PCT/EP2011/071652
§ 371 (c)(1),
(2), (4) Date: Aug. 14, 2013

(87) PCT Pub. No.: WO2012/072807
PCT Pub. Date: Jun. 7, 2012

(30) Foreign Application Priority Data

Dec. 3, 2010 (EP) .................................... 10193715

(51) Int. Cl.
*H04J 14/00* (2006.01)

(52) U.S. Cl.
CPC ..................................... *H04J 14/005* (2013.01)

(58) Field of Classification Search
CPC .... H04B 10/50; H04B 10/516; H04B 10/504; H04B 10/505; H04B 10/5055; H04B 10/54; H04J 14/005; H04J 14/007; H04J 14/0227; H04J 14/0272; H04J 14/0275
USPC .............. 398/77, 78, 183, 79, 141, 186, 187, 398/188, 200, 201, 30, 31, 32, 158, 159, 398/135, 136
See application file for complete search history.

(56) References Cited

U.S. PATENT DOCUMENTS

| | | | |
|---|---|---|---|
| 6,111,675 A | 8/2000 | Mao et al. | |
| 6,592,273 B1 * | 7/2003 | Habel et al. | ................... 398/140 |
| 7,190,897 B2 * | 3/2007 | Gehlot | ........................... 398/30 |
| 2004/0020833 A1 | 2/2004 | Frank | |
| 2009/0190928 A1 | 7/2009 | Gentner et al. | |

FOREIGN PATENT DOCUMENTS

WO  2012/072807 A2  6/2012

OTHER PUBLICATIONS

European Office Action for Application No. 10193715.9, 5 pages, dated Jan. 21, 2013.

\* cited by examiner

*Primary Examiner* — Hanh Phan
(74) *Attorney, Agent, or Firm* — Nelson Mullins Riley & Scarborough LLP

(57) ABSTRACT

A first optical data signal is transmitted on a first data carrier from a first network element. First service information is transmitted from a first service by means of a first optical service signal on a first service carrier. A second optical data signal is transmitted on a second data carrier from a second network element, and second service information is transmitted by a second optical service signal on a second service carrier. An offset between a frequency of the first data carrier and a frequency of the first service carrier is substantially equal to an offset between a frequency of the second data carrier and a frequency of the second service carrier.

15 Claims, 4 Drawing Sheets

OPTICAL COMMUNICATION METHOD AND SYSTEM

RELATED APPLICATIONS

This application is a 35 U.S.C. 371 national stage filing of International Application No. PCT/EP2011/071652, filed on Dec. 2, 2011, which claims priority to European Patent Application No.: 10 193 715.9, filed on Dec. 3, 2010. The contents of the aforementioned applications are hereby incorporated by reference.

FIELD OF THE INVENTION

The invention refers to a method and to an apparatus for signal processing in a communication system (e.g. an optical communication system) and, more specifically, relate to Operations, Administration and Management (OAM) for optical communication service.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section Network administration and management entails configuration and monitoring of virtually all the network elements, including transmitters, receivers, switches and add-drop multiplexers. The accomplishment of this task requires exchange of service information along the network.

Transport networks require the support of critical functionalities as Operations, Administration and Management (OAM). In an optical network it may be beneficial transmitting auxiliary service information associated with individual channels or channel groups. This may include the used wavelengths, the adopted modulation format, the Forward Error Correction (FEC) type, the accumulated chromatic dispersion, routing information, source and destination identifiers, alarms and, possibly, parasitic low-rate channels.

OAM information should be propagated reliably by using the lowest possible amount of network resources and should be ideally accessible and modifiable at any network element.

In order to simplify monitoring and management of large networks, read and write access to the service information should be possible both for single channels and for channel groups and channel-specific information should be routed congruently with the associated channel.

A large number of methods to transmit OAM information out-of-band are known from the prior art. Cited for example is IETF RFC 3945, *"Generalized Multi-Protocol Label Switching (GMPLS) Architecture,"* October 2004, where, according to the Generalized Multi-Protocol Label Switching (GMPLS) method, OAM information is transmitted on a dedicated wavelength or over a separated network. This approach, however, does not fulfill the congruence requirement for OAM. Explicit measures are required to enforce co-routing with the associated channels, which results into error prone solutions. Moreover, the use of additional resources for OAM signalling is possibly associated with inefficient implementations.

According to an alternative known method, cited in IETF RFC 5654, *"Requirements of an MPLS Transport Profile"*, September 2009, signalling information can be multiplexed with the data in the digital domain through the implementation of the Generic Associated Channel (G-ACh). With this approach, however, both read and write access to the service information require a termination of the data channel, which, in the case of optical communications, implies expensive electro-optical conversion with a full-fledged receiver.

The use of Sub-Carrier Multiplexing (SCM) for the transmission of control channels is discussed in the document: S. F. Su, and R. Olshansky, *"Performance of Multiple Access WDM Networks with Subcarrier Multiplexed Control Channels," J. Lightwave Technol.*, vol. 11, no. 5/6, pp. 1028-1033, 1993., whose authors consider service signalling for the control of a multiple access Wavelength Division Multiplexing (WDM) network. According to the cited document, the control channels are frequency-multiplexed with the data channel and a single wavelength can accommodate, besides the data channel, multiple sub-carriers. Every SCM receiver scans only one dedicated sub-carrier and the SCM transmitters must tune their transmit frequency according to the addressed SCM receiver. At each SCM receiver all optical wavelengths reach the photodiode; the SCM receiver extracts only its own associated subcarrier out of the resulting electrical signal. Unfortunately, with this solution each service receiver can communicate only with a single service transmitter at a time, which prevents the implementation of genuine OAM. Moreover, the number of reserved sub-carriers needs to grow with the network size, which results into complex SCM transceivers and inefficient resource exploitation.

A method and an apparatus for encoding, transmitting and decoding labels in an optical packet network are introduced in the U.S. Pat. No. 7,512,342 B1 (M. D. Feuer and V. A. Vaishampayan, "Digital Encoding of Labels for Optical Packet Networks,") and in the U.S. Pat. No. 7,630,636 B1 (M. D. Feuer and V. A. Vaishampayan, "Optical Swapping of Digitally-Encoded Optical Labels"). In the cited documents the payload data are encoded through a Complementary Constant Weight Code (CCWC) of rate K/N, which increases the line rate and provides the necessary room for the transmission of controlling information in the form of packet labels. In the known method, the CCWC associates each block of K payload bits with two codewords of N bits having different binary weights. The transmitter chooses between the low-weight and the high-weight codewords according to the value of the packet label. Every K payload bits, the transmitter can convey an additional label bit by modulating the binary weight of the transmitted stream. Since in the case of conventional On-Off Keying (OOK) the binary weight is proportional to the transmit power, the labels can be recovered by detecting the average power of the received signal with a low-speed photodiode without terminating the data channel. For WDM networks, code division multiplexing can be used to separate labels associated with multiple wavelengths.

Unfortunately, the use of the Complementary Constant Weight Code (CCWC) increases the line rate and consumes part of the available overhead that can be allocated to Forward Error Correction (FEC).

Moreover, since the CCWC is not systematic, the wrong detection of a single CCWC codeword results into multiple bit errors. This error multiplication has a detrimental effect on the performance of the subsequent FEC decoder. In particular the design of the CCWC is heavily constrained, because a short code length N results into a significant overhead, whereas a long code length results into considerable error multiplication.

Additionally, the approach is not "transparent", in the sense that unaware receivers are not able to recover the payload data that have undergone CCWC encoding.

Finally, the method does not foresee label stacking along the optical network nor read and write access per wavelength group.

The problem to be solved is to avoid the disadvantages mentioned above and in particular to provide a method which allows the implementation of genuine optical Operation, Administration and Maintenance (OAM) for optical communication networks in which a single service transmitter may transmit the same service information on multiple optical signals at the same time.

A cost efficient technique is needed that allows read and write access to service information without termination of the data channel and transmission of per-group service information.

SUMMARY OF THE INVENTION

In order to overcome the above-described need in the art, the present invention discloses a method for an optical communication network including a first and a second network element, the first network element comprising a first service transmitter and the second network element comprising a second service transmitter, the method comprising the steps of transmitting data from the first network element by means of a first optical data signal on a first data carrier, transmitting first service information from the first service transmitter by means of a first optical service signal on a first service carrier, transmitting data from the second network element by means of a second optical data signal on a second data carrier, transmitting second service information from the second service transmitter by means of a second optical service signal on a second service carrier, wherein the offset between the frequency of the first data carrier and the frequency of the first service carrier is substantially equal to the offset between the frequency of the second data carrier and the frequency of the second service carrier.

It is also an embodiment that the method for an optical communication network further comprises the steps of assigning a first spreading sequence to the first service transmitter and assigning a second spreading sequence to the second service transmitter.

In a further embodiment, the method for an optical communication network further comprises the step of receiving at the same time the first optical service signal and the second optical service signal by means of a service receiver.

In a next embodiment, the method for an optical communication network further comprises the step of discriminating the first optical service signal from the second optical service signal through detection of the first and second spreading sequences.

In an alternative embodiment, the first and second spreading sequences are orthogonal spreading sequences assigned according to synchronous code division multiplexing (CDM).

It is also an embodiment that the orthogonal spreading sequences are Walsh sequences.

In other alternative embodiments of the present invention, the first and second spreading sequences are Pseudo-Noise (PN) sequences assigned according to asynchronous code division multiplexing (CDM).

In a further embodiment, the receiver is a direct detector configured to tap a portion of the first optical service signal without demodulating the first optical data signal. In this way service information can be recovered at any service receiver without terminating the data channel without the employment of expensive electro-optical conversion which would include the use of full fledged receiver.

In a next embodiment, the method for an optical communication network further comprises the step of intensity modulating the first service carrier.

It is also an embodiment that the first service transmitter modulates multiple service carriers in the optical domain so that the first service information can be transmitted by a plurality of optical service signals at the same time. In this way a single service transmitter may transmit the same service information on multiple optical signals at the same time. This is possible if the service transmitter modulates the service sub-carriers in the optical domain, rather than in the electrical domain. Transmission of per-group service information (rather then per-channel) is especially useful to manage network elements (e.g.: optical amplifiers, cross-connects, etc.) that operate on multiple optical signals at the same time.

In a further embodiment, a service receiver can extract the part of service information that is common to a group of optical signals by sending all the relevant signals to the same service receiver.

In a next embodiment, the optical communication network includes a third network element traversed by the first optical data signal and by the first optical service signal, the method for an optical communication network further comprises the step of transmitting third service information from the third network element by means of a third optical service signal without interfering with the first optical service signal and without demodulating the first optical data signal. Since, according to the present embodiment, the data channels are propagated through the network, the service transmitters embedded in each traversed network element can add new service information without terminating the data channel and without interfering with the service information inserted by the previous elements.

In an alternative embodiment, the first, second and third service information include Operation, Administration and Maintenance (OAM) information.

It is also an embodiment that the optical signals are wavelength division multiplexed (WDM) optical signals.

In a further embodiment, the offset between the frequency of the first data carrier and the frequency of the first service carrier is less than the bandwidth of the first optical data signal, so that the first service carrier lies within the frequency spectrum of the first optical data signal.

In a next embodiment, the offset between the frequency of the first data carrier and the frequency of the first service carrier is larger than the bandwidth of the first optical data signal, so that the first service carrier lies outside the frequency spectrum of the first optical data signal.

The problem stated above is also solved by a system for optical communication system comprising a first network element for transmitting data by means of a first optical data signal on a first data carrier, the first network element including a first service transmitter configured to transmit first service information by means of a first optical service signal on a first service carrier; a second network element for transmitting data by means of a second optical data signal on a second data carrier, the second network element including a second service transmitter configured to transmit second service information by means of a second optical service signal on a second service carrier; wherein the offset between the frequency of the first data carrier and the frequency of the first service carrier is substantially equal to the offset between the frequency of the second data carrier and the frequency of the second service carrier.

The method and the apparatus provided, in particular, bears the following advantages:
a) It allows the implementation of genuine all-optical Operation, Administration and Maintenance (OAM) for optical communication networks in which a single service transmitter may transmit the same service information on multiple optical signals at the same time.
b) Read and write access to service information do not require a termination of the data channel and therefore do not require expensive electro-optical conversion which would imply the use of full fledged receiver.
c) It allows transmission of per-group service information, which is especially useful to manage network elements that operate on multiple optical signals at the same time.
d) The service transmitters embedded in each traversed network element can add new service information without terminating the data channel and without interfering with the service information inserted by the previous elements.
e) It is easy to implement and provides efficient resource exploitation without the employment of complex Sub-Carrier Multiplexing (SCM) transceivers.

BRIEF DESCRIPTION OF THE DRAWINGS

The invention is explained by way of example in more detail below with the aid of the attached drawings.

DESCRIPTION OF THE INVENTION

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
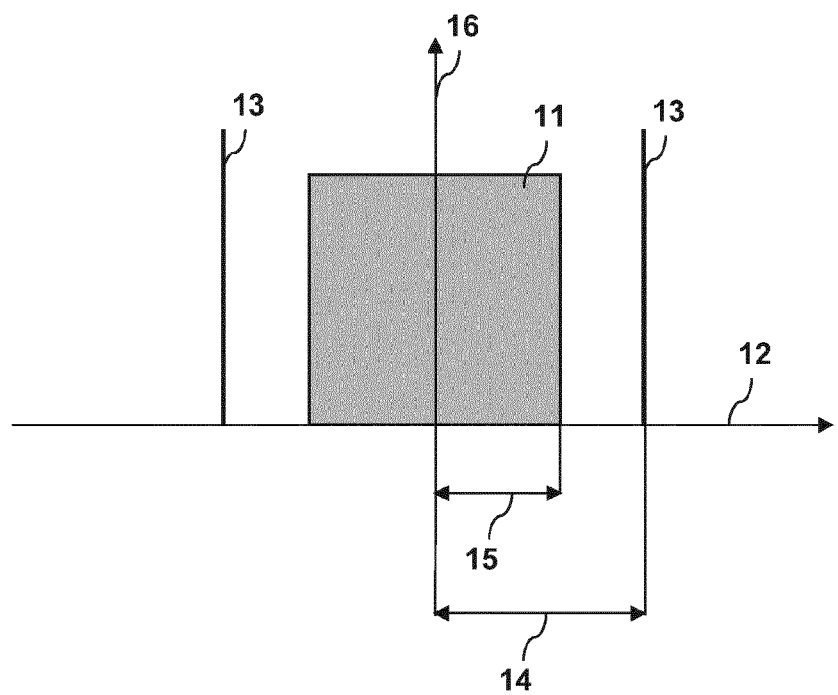
FIG. 1 is a schematic representation of the spectrum of a data channel with the associated service sub-carrier according to an embodiment of the invention.

FIG. 1 is a schematic representation of the spectrum of a data channel 11 with the associated service sub-carrier 13 according to an embodiment of the invention. In particular, FIG. 1 shows the spectrum after demodulation of a data channel 11 with the data carrier signal 16 and the service carrier 13 in the frequency domain 12, the offset 14 between the frequency of the data carrier 16 and the frequency of the service carrier 13 being larger than the bandwidth 15 of the optical data signal, so that the service carrier 13 lies outside the frequency spectrum 11 of the optical data signal. If the modulation depth of the sub-carrier is low enough, the data channel is not appreciably impaired.

Figure 2:
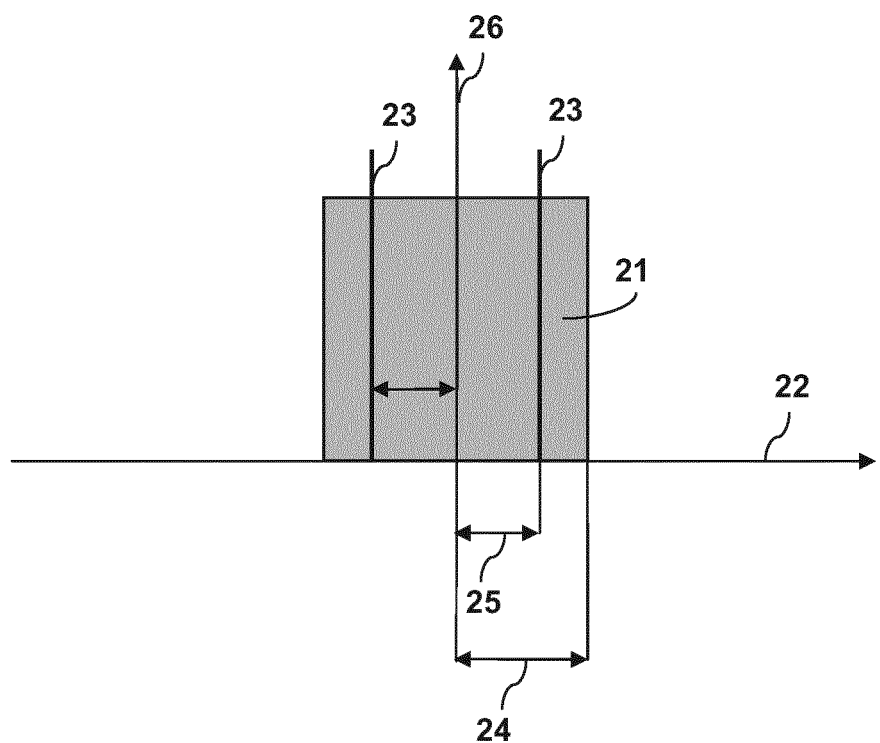
FIG. 2 is a schematic representation of the spectrum of a data channel with the associated service sub-carrier according to another embodiment of the invention.

FIG. 2 is a schematic representation of the spectrum of a data channel 21 with the associated service sub-carrier 23 according to an embodiment of the invention. In particular, FIG. 2 shows the spectrum after demodulation of a data channel 21 with the data carrier signal 26 and the service carrier 23 in the frequency domain 22, the offset 24 between the frequency of the data carrier 26 and the frequency of the service carrier 23 being less than the bandwidth 25 of the optical data signal, so that the service carrier 23 lies outside the frequency spectrum 21 of the optical data signal.

In both embodiments, shown in FIG. 1 and in FIG. 2, OAM information addressed to all service receivers is conveyed by intensity modulation of a common service sub-carrier.

By leveraging the huge disproportion between the rates of service and data channels in an optical network, it is possible to dimension the intensity modulation of the service channel in order to produce negligible impact on the data channels and assure at the same time that the service channel attains the same reach of the data channel.

For all wavelengths the sub-carrier is placed at the same offset from the data channel.

Independently of the modulation format used for the optical channel, the sub-carrier can be detected by a direct receiver. The service information can be recovered at any network element without terminating the data channel by coupling a small portion of the optical signal to a direct detector.

As the data channels are propagated through the network, each traversed network element can add new signalling information without interfering with the information inserted by the previous elements.

Multiple service transmitters can communicate with the same service receiver by using different spreading sequences. This can enable crucial OAM services, as end-to-end optical route tracing and performance monitoring, which require the accumulation of service information from each traversed network element along the route.

Different OAM transmitters and/or receivers sharing the same medium can be separated through Code Division Multiplexing (CDM).

If a common timing reference is available to all the network elements, synchronous CDM can be used. In this case the network elements use a set of orthogonal spreading sequences, e.g. the Walsh sequences. The interference among different service transmitters cancels out perfectly.

If a common timing reference is not available, asynchronous CDM must be used. In this case each network element uses a different Pseudo-Noise (PN) sequence. The PN sequences are uncorrelated but not perfectly orthogonal; thus each sequence can increase the noise level perceived by the others.

At the transmitter or at the 3R repeaters the intensity modulation of the sub-carrier can be achieved either in the optical domain or by electrical (digital or analogue) means. Optical implementation can be realized by modulating the bias current of the laser diode or the pump laser bias of the fibre amplifier. Electrical implementation can be achieved by perturbing the electrical signal that controls the modulator.

Figure 3:
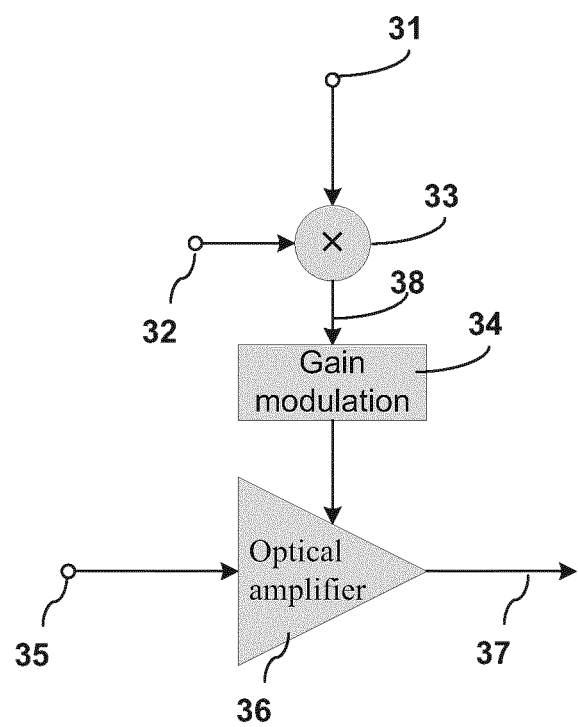
FIG. 3 is a schematic representation which illustrates the modulation of the service sub-carrier in the optical domain according to an embodiment of the invention.

FIG. 3 is a schematic representation which illustrates the modulation of the service sub-carrier in the optical domain according to an embodiment of the invention. In particular, FIG. 3 shows service information 31 (e.g. Operation, Administration and Maintenance) combined to a spreading sequence 32 by means of a multiplying unit 33. The resulting combination 38 modulates the gain of an optical amplifier 36 by means of a gain modulation unit 34. As a consequence, data channels 35 fed as input to the optical amplifier 36 are outputted as data channel with additional service information 37. By modulating the gain 34 of an optical amplifier 36 it is possible to impose the same intensity modulation to all the amplified wavelengths.

Figure 4:
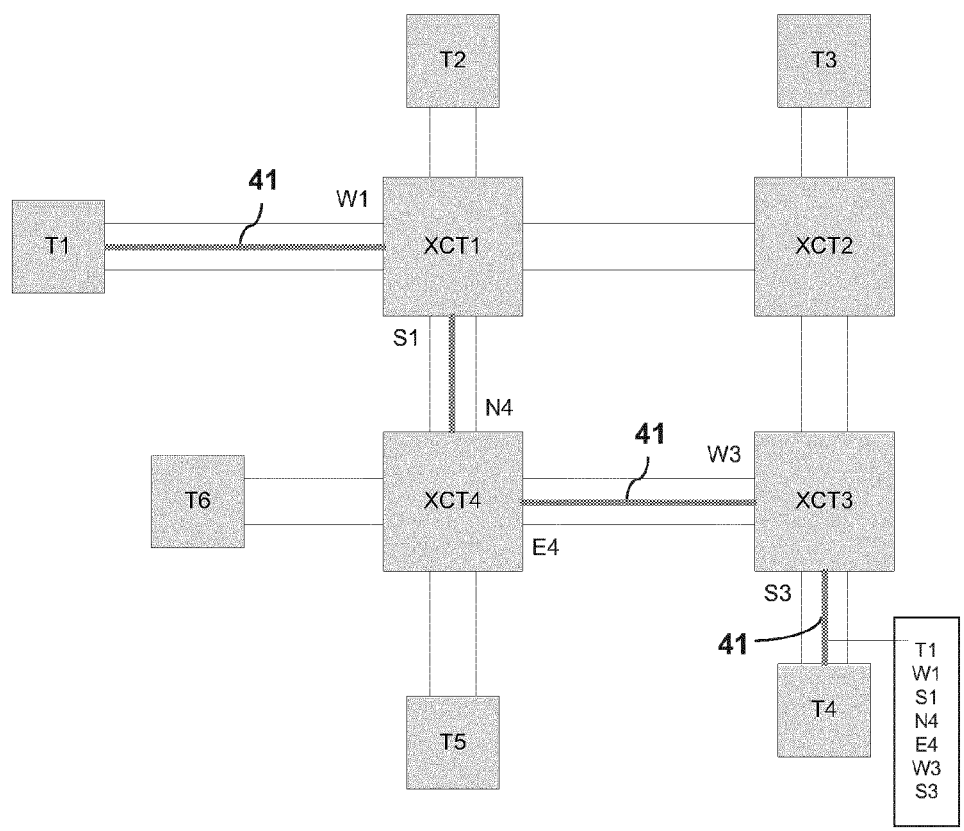
FIG. 4 is a schematic representation which illustrates a meshed network and an optical route tracing of an exemplary data channel according to an embodiment of the invention.

FIG. 4 is a schematic representation which illustrates a meshed network and an optical route tracing of an exemplary data channel according to an embodiment of the invention. In particular FIG. 4 shows the network nodes T1, T2, T3, T4, T5 and T6, and the intermediate cross-connect (XCT) elements XCT1, XCT2, XCT3 and XCT4. If the optical amplifier is placed at the input or at the output port of an optical cross-connect or of an add-drop multiplexer, tagging the optical channels with route-dependent information is possible.

As illustrated in FIG. 3, by this feature the receiver can trace the optical route of a data channel 41 along the network. In particular, it can detect misconfiguration of any intermediate cross-connect (XCT) element or add-drop multiplexer, which is an essential Operation, Administration and Maintenance (OAM) functionality.

Since the impact of chromatic dispersion over the service channel can be considered negligible as a consequence of its low line rate, information inserted synchronously into several data channels at the same network element remains synchronous along the network if the channels follow the same route.

At any network element the service receiver can selectively extract the desired service information by correlating the receive stream with the corresponding spreading sequence.

If a group of wavelengths impinges on a direct receiver, the resulting electrical sub-carrier is the superposition of the sub-carriers associated with the individual data-channels. Information carried by several wavelengths over the same spreading sequence interferes constructively. By converse, uncorrelated information sent over the same spreading sequence cancels out. This allows extracting the part of information that is common to a group of optical channels. This functionality can help bringing complex cross-connect elements into service.

By using a simple direct receiver it is possible to detect the common destination address of a group of channels, independently of any additional information possibly conveyed by the service sub-carrier In general, the various exemplary embodiments of the algorithm described by example above may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention are described above by way of schematic diagrams, table, flow chart and block diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The present invention is not limited to the details of the above described principles. The scope of the invention is defined by the appended claims and all changes and modifications as fall within the equivalents of the scope of the claims are therefore to be embraced by the invention. Various modifications and adaptations to the foregoing exemplary embodiments of this invention may become apparent to those skilled in the relevant arts in view of the foregoing description, when read in conjunction with the accompanying drawings. However, any and all such modifications still fall within the scope of the non-limiting and exemplary embodiments of this invention.

LIST OF ABBREVIATIONS

CDM Code Division Multiplexing
CCWC Complementary Constant Weight Code
FEC Forward Error Correction
G-ACh Generalized Multi-Protocol Label Switching
GMPLS Forward Error Correction
MPLS-TP Multi-Protocol Label Switching—Traffic Profile
OAM Operations, Administration, and Management
OOK On-Off Keying
PN Pseudo-Noise
SCM Sub-Carrier Multiplexing
WDM Wavelength Division Multiplexing
XCT Cross-Connect

The invention claimed is:

1. A method for an optical communication network including a first and a second network element, the first network element comprising a first service transmitter and the second network element comprising a second service transmitter, the method comprising:
   transmitting data from the first network element by means of a first optical data signal on a first data carrier;
   transmitting first service information from the first service transmitter by means of a first optical service signal on a first service carrier;
   transmitting data from the second network element by means of a second optical data signal on a second data carrier;
   transmitting second service information from the second service transmitter by means of a second optical service signal on a second service carrier;
   characterized in that:
   the offset between the frequency of the first data carrier and the frequency of the first service carrier is substantially equal to the offset between the frequency of the second data carrier and the frequency of the second service carrier.

2. The method according to claim 1, further comprising:
   assigning a first spreading sequence to the first service transmitter; and
   assigning a second spreading sequence to the second service transmitter.

3. The method according to claim 2, further comprising:
   receiving at the same time the first optical service signal and the second optical service signal by means of a service receiver.

4. The method according to claim 3, further comprising:
   discriminating the first optical service signal from the second optical service signal through detection of the first and second spreading sequences.

5. The method according to claim 3, wherein the receiver is a direct detector configured to tap a portion of the first optical service signal without demodulating the first optical data signal.

6. The method according to claim 2, wherein the first and second spreading sequences are orthogonal spreading sequences assigned according to synchronous code division multiplexing (CDM).

7. The method according to claim 6, wherein the orthogonal spreading sequences are Walsh sequences.

8. The method according to claim 2, wherein the first and second spreading sequences are Pseudo Noise (PN) sequences assigned according to asynchronous code division multiplexing (CDM).

9. The method according to claim 1, further comprising intensity modulating the first service carrier.

10. The method according to claim 1, wherein the first service transmitter modulates multiple service carriers in the optical domain so that the first service information can be transmitted by a plurality of optical service signals at the same time.

11. The method according to claim 1, the optical communication network including a third network element traversed by the first optical data signal and by the first optical service signal, the method further comprising
   transmitting third service information from the third network element by means of a third optical service signal without interfering with the first optical service signal and without demodulating the first optical data signal.

12. The method according to claim 11, wherein the first, second and third service information include operation, administration and maintenance (OAM) information.

13. The method according to claim 1, wherein the offset between the frequency of the first data carrier and the frequency of the first service carrier is less than the bandwidth of the first optical data signal, so that the first service carrier lies within the frequency spectrum of the first optical data signal.

14. The method according to claim 1, wherein the offset between the frequency of the first data carrier and the frequency of the first service carrier is larger than the bandwidth of the first optical data signal, so that the first service carrier lies outside the frequency spectrum of the first optical data signal.

15. A system for optical communication system comprising
   a first network element for transmitting data by means of a first optical data signal on a first data carrier, the first network element including a first service transmitter configured to transmit first service information by means of a first optical service signal on a first service carrier;
   a second network element for transmitting data by means of a second optical data signal on a second data carrier, the second network element including a second service transmitter configured to transmit second service information by means of a second optical service signal on a second service carrier;
   characterized in that:
   the offset between the frequency of the first data carrier and the frequency of the first service carrier is substantially equal to the offset between the frequency of the second data carrier and the frequency of the second service carrier.

* * * * *